United States Patent
Tachibana et al.

(10) Patent No.: US 12,037,965 B2
(45) Date of Patent: Jul. 16, 2024

(54) FUEL SUPPLY DEVICE

(71) Applicant: TOYOTA JIDOSHA KABUSHIKI KAISHA, Toyota (JP)

(72) Inventors: Mina Tachibana, Toyota (JP); Tomihisa Tsuchiya, Toyota (JP); Yuki Suzuki, Kariya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/515,256

(22) Filed: Nov. 21, 2023

(65) Prior Publication Data
US 2024/0200514 A1 Jun. 20, 2024

(30) Foreign Application Priority Data
Dec. 20, 2022 (JP) ................. 2022-203310

(51) Int. Cl.
*F02M 21/02* (2006.01)
(52) U.S. Cl.
CPC .... *F02M 21/0239* (2013.01); *F02M 21/0242* (2013.01); *F02M 21/0248* (2013.01)
(58) Field of Classification Search
CPC ............. F02M 21/02; F02M 21/0239; F02M 21/0242; F02M 21/0245; F02M 21/0248; F02M 63/023; F02D 19/024; F02D 19/025; F02D 19/0623; F02D 41/0025; F02D 41/221; F02D 41/222; F02D 41/3809; F02D 41/3863; F02D 2041/223; F02D 2041/224; F02D 2041/3881; Y02T 10/30
See application file for complete search history.

(56) References Cited

U.S. PATENT DOCUMENTS

| | | | |
|---|---|---|---|
| 6,901,912 B1 * | 6/2005 | Onishi | F02M 63/0225 123/456 |
| 7,331,170 B2 * | 2/2008 | Shimoda | F01N 3/033 60/275 |
| 2013/0199499 A1 * | 8/2013 | Pursifull | F02D 41/0025 123/456 |
| 2018/0066621 A1 * | 3/2018 | Nagakura | F02D 41/38 |
| 2018/0202384 A1 * | 7/2018 | Nagakura | F02D 41/3094 |
| 2020/0362789 A1 * | 11/2020 | Kondo | F02D 41/1466 |
| 2023/0250783 A1 * | 8/2023 | Satomi | B60W 10/08 |

FOREIGN PATENT DOCUMENTS

JP 2007-332879 A 12/2007

* cited by examiner

*Primary Examiner* — Logan M Kraft
*Assistant Examiner* — Johnny H Hoang

(57) ABSTRACT

A fuel supply device includes a fuel injection valve, a delivery pipe, a relief passage, a first valve, and a second valve. The fuel injection valve injects gas fuel. The delivery pipe supplies the gas fuel to the fuel injection valve. The relief passage connects an intake passage of an internal combustion engine and the delivery pipe. The first valve is configured to supply the gas fuel in the delivery pipe to the relief passage. The second valve is arranged in the relief passage. The second valve opens when a downstream pressure becomes lower than an upstream pressure by an amount that is greater than or equal to a specified pressure determined in advance.

2 Claims, 1 Drawing Sheet

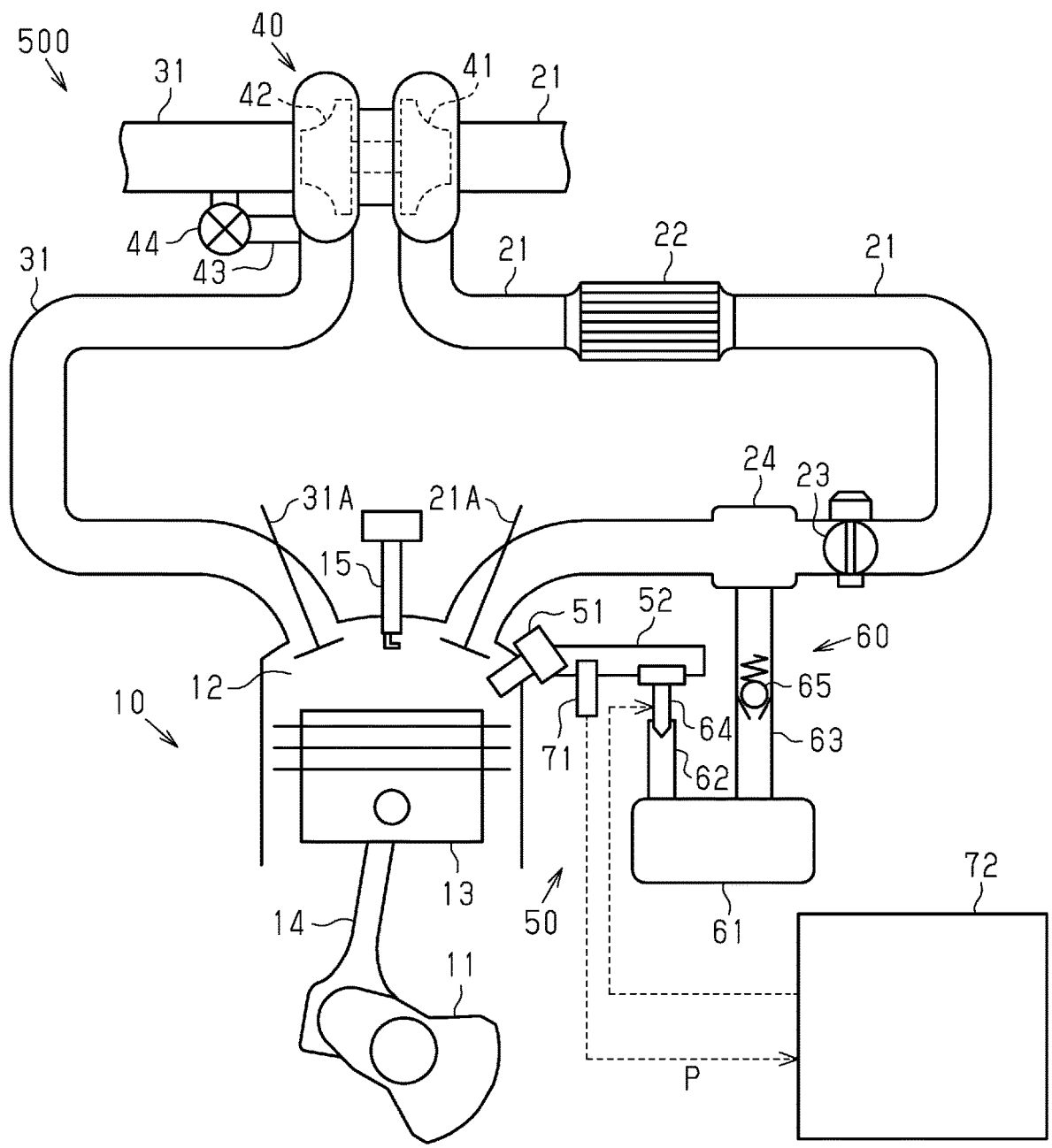

FUEL SUPPLY DEVICE

RELATED APPLICATION

The present application claims priority of Japanese Patent Application No. 2022-203310 filed on Dec. 20, 2022, the disclosure of which is hereby incorporated by reference herein in its entirety.

BACKGROUND

1. Field

The following description relates to a fuel supply device.

2. Description of Related Art

Japanese Laid-Open Patent Publication No. 2007-332879 describes a fuel supply device that includes a delivery pipe and a fuel injection valve. The fuel injection valve is supplied with gas fuel through the delivery pipe. Further, the fuel supply device includes a relief pipe and a relief valve. An upstream end of the relief pipe is connected to the delivery pipe. A downstream end of the relief pipe is connected to an intake passage of an internal combustion engine. If the pressure inside the delivery pipe is higher than an allowable limit pressure when the internal combustion engine is started, the relief valve is switched from a closed state to an open state. When the relief valve is in the open state, the gas fuel is discharged to the intake passage through the relief pipe. This lowers the pressure of the delivery pipe.

With the technique described in the above patent publication, if the pressure inside the delivery pipe is high when the internal combustion engine is started, a large amount of gas fuel flows into the intake passage. In contrast, an amount of intake air supplied to the internal combustion engine is relatively small when the internal combustion engine is started. This may unintendedly lead to a fuel-rich state upon the activation of the internal combustion engine.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a fuel supply device includes a fuel injection valve, a delivery pipe, a relief passage, a first value, and a second valve. The fuel injection valve is configured to inject gas fuel. The delivery pipe supplies the gas fuel to the fuel injection valve. The relief passage connects an intake passage of an internal combustion engine and the delivery pipe. The first valve is configured to open so that the gas fuel in the delivery pipe is supplied to the relief passage. The second valve is arranged in the relief passage. The delivery pipe, the first valve, the second valve, and the intake passage are arranged in this order. When a downstream pressure refers to a pressure of the relief passage at a side of the second valve toward the intake passage, and an upstream pressure refers to a pressure of the relief passage at a side of the second valve toward the delivery pipe, the second valve is configured to open when the downstream pressure becomes lower than the upstream pressure by an amount that is greater than or equal to a specified pressure determined in advance.

Other features and aspects will be apparent from the following detailed description, the drawings, and the claims.

BRIEF DESCRIPTION OF THE DRAWING

FIG. 1 is a schematic diagram of a vehicle including an internal combustion engine and a fuel supply device.

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

A fuel supply device according to one embodiment will now be described with reference to the drawings.

Structure of Internal Combustion Engine

As shown in FIG. 1, a vehicle 500 includes an internal combustion engine 10. The internal combustion engine 10 uses gas fuel, for example, hydrogen. The internal combustion engine 10 includes a crankshaft 11, four cylinders 12, four pistons 13, four connecting rods 14, and four ignition plugs 15. FIG. 1 shows one of the four sets of the cylinder 12, the piston 13, the connecting rod 14, and the ignition plug 15.

The cylinder 12 is a space for burning air-fuel mixture of fuel and intake air. The piston 13 reciprocates in the cylinder 12 as the air-fuel mixture burns. The piston 13 is coupled to the crankshaft 11 by the connecting rod 14. The connecting rod 14 transmits the reciprocating motion of the piston 13 as the rotation of the crankshaft 11. The tip of the ignition plug 15 is located in the cylinder 12. The ignition plug 15 ignites the air-fuel mixture in the cylinder 12.

As shown in FIG. 1, the internal combustion engine 10 includes an intake passage 21 and an exhaust passage 31. The intake passage 21 is a flow passage for intake air. The intake passage 21 is connected to the cylinders 12. The exhaust passage 31 is a passage for exhaust. The exhaust passage 31 is connected to the cylinders 12.

The internal combustion engine 10 includes intake valves 21A and exhaust valves 31A. FIG. 1 shows only one of the intake valves 21A and only one of the exhaust valves 31A. The intake valves 21A are provided on the respective cylinders 12. The intake valve 21A is located at a position where the intake passage 21 is connected to the cylinder 12. The intake valve 21A is actuated to open and close an open portion of the intake passage 21 at the side of the cylinder 12. The exhaust valves 31A are provided on the respective cylinders 12. The exhaust valve 31A is located at a position where the exhaust passage 31 is connected to the cylinder 12. The exhaust valve 31A is actuated to open and close an open portion of the exhaust passage 31 at the side of the cylinder 12.

The internal combustion engine 10 includes an intercooler 22, a throttle valve 23, and a surge tank 24. The intercooler 22 is located at an intermediate portion of the intake passage 21. The intercooler 22 cools intake air. The throttle valve 23 is located at a downstream side of the intercooler 22 in the intake passage 21. The throttle valve 23 is capable of adjusting a degree at which the throttle valve 23 is open. The throttle valve 23 adjusts the amount of intake air flowing into the cylinder 12 in accordance with the open degree. The surge tank 24 is located at a downstream side of the throttle valve 23 in the intake passage 21. The surge tank 24 is capable of storing a certain volume of intake air.

The vehicle 500 includes a forced-induction device 40. The forced-induction device 40 extends across the intake passage 21 and the exhaust passage 31. The forced-induction device 40 includes a compressor wheel 41, a turbine wheel 42, a bypass passage 43, and a wastegate valve 44. The compressor wheel 41 is located at an upstream side of the intercooler 22 in the intake passage 21. The turbine wheel 42 is located at an intermediate portion of the exhaust passage 31. The turbine wheel 42 is rotated in response to the flow of exhaust. The compressor wheel 41 rotates integrally with the turbine wheel 42. The compressor wheel 41 compresses intake air as it rotates and delivers the compressed air. That is, the rotation of the compressor wheel 41 supercharges the intake air. The bypass passage 43 connects an upstream section and a downstream section of the exhaust passage 31 with respect to the turbine wheel 42. That is, the bypass passage 43 is a passage that bypasses the turbine wheel 42. The wastegate valve 44 is located at the downstream end of the bypass passage 43. The wastegate valve 44 is capable of adjusting a degree at which the wastegate valve 44 is open. A change in the opening degree of the wastegate valve 44 changes the amount of exhaust gas flowing through the bypass passage 43.

Fuel Supply Device

As shown in FIG. 1, the vehicle 500 includes a fuel supply device 50. The fuel supply device 50 includes four fuel injection valves 51 and a delivery pipe 52. FIG. 1 shows only one of the four fuel injection valves 51.

The fuel injection valve 51 directly injects gas fuel into the cylinder 12 without using the intake passage 21. That is, the fuel injection valve 51 is an in-cylinder injection valve. The delivery pipe 52 is a fuel circulation passage for supplying gas fuel to the fuel injection valve 51. The delivery pipe 52 is connected to a fuel tank (not shown). That is, the delivery pipe 52 receives gas fuel from the fuel tank.

The fuel supply device 50 includes a relief passage 60. The relief passage 60 includes a vacuum tank 61, a first relief passage 62, and a second relief passage 63.

The pressure inside the vacuum tank 61 is lower than the atmospheric pressure. When the wastegate valve 44 is fully open, that is, when the internal combustion engine 10 is performing a non-supercharging operation, the air in the vacuum tank 61 is drawn into the surge tank 24. In other words, the vacuum tank 61 stores the negative pressure of the surge tank 24 during the non-supercharging operation.

The vacuum tank 61 supplies a negative pressure to an actuator of the vehicle 500. Specifically, the vacuum tank 61 supplies negative pressure to a brake booster of the vehicle 500. Thus, the vacuum tank 61 has a sufficient volume to cause the actuator of the vehicle 500 to operate at a negative pressure.

The first relief passage 62 connects the delivery pipe 52 to the vacuum tank 61. The second relief passage 63 connects the vacuum tank 61 to the surge tank 24. Thus, the entire relief passage 60 connects the intake passage 21 of the internal combustion engine 10 to the delivery pipe 52. This allows the gas fuel in the delivery pipe 52 to flow into the surge tank 24 through the first relief passage 62, the vacuum tank 61, and the second relief passage 63.

The fuel supply device 50 includes a first valve 64 and a second valve 65.

The first valve 64 is arranged at a position where the delivery pipe 52 is connected to the first relief passage 62. The first valve 64 is an electronically controlled electromagnetic valve. The first valve 64 is normally closed. The first valve 64 is electrically switchable between an open state and a closed state. When the first valve 64 is open, the gas fuel in the delivery pipe 52 is supplied to the relief passage 60.

The second valve 65 is arranged in the relief passage 60. Specifically, the second valve 65 is located at an intermediate portion of the second relief passage 63. The second valve 65 is a one-way valve. The second valve 65 only allows flow from the vacuum tank 61 to the surge tank 24 in the second relief passage 63. Since the second valve 65 is located at an intermediate portion of the second relief passage 63, the vacuum tank 61 is located at a side of the second valve 65 closer to the delivery pipe 52. In other words, the delivery pipe 52, the vacuum tank 61, and the second valve 65 are arranged in this order.

Although the drawing does not show the detail, the second valve 65 includes a body and a valve member capable of opening and closing an open portion in the body. The valve member is pressed against the open portion of the body by a spring. The valve member closes the open portion of the body with the pressing force of the spring. Further, the valve member opens when a difference between the pressure at the downstream side of the valve member and the pressure at the upstream side of the valve member becomes greater than the pressing force of the spring. The pressure of the relief passage 60 at a side of the second valve 65 toward the intake passage 21 will be referred to as the downstream pressure. The pressure of the relief passage 60 at a side of the second valve 65 toward the delivery pipe 52 will be referred to as the upstream pressure.

The second valve 65 opens when the downstream pressure becomes lower than the upstream pressure by an amount that is greater than or equal to a specified pressure. Accordingly, the specified pressure is determined in advance as the pressure difference that allows the valve member to actuate against the pressing force of the spring.

Controller

The vehicle 500 includes a pressure sensor 71 and a controller 72.

The pressure sensor 71 is located in the delivery pipe 52. The pressure sensor 71 detects an in-pipe pressure P in the delivery pipe 52.

The controller 72 controls the first valve 64. The controller 72 obtains a signal indicating the in-pipe pressure P from the pressure sensor 71. The controller 72 opens the first valve 64 in a case where the in-pipe pressure P is greater than or equal to a specified pipe pressure. The specified pipe pressure can be determined through experiments, simulations, or the like as the pressure that reduces leakage of gas fuel from the fuel injection valves 51 or the like to a permissible level.

The controller 72 can be circuitry including one or more processors that execute various processes in accordance with computer programs (software). Alternatively, the controller 72 may be circuitry including one or more exclusive hardware circuits, such as an application specific integrated circuit (ASIC), to execute at least part of various processes. Further, the controller 72 may be circuitry including a combination of the above. The processor includes a computer processing unit (CPU) and a memory, such as a random-access memory (RAM) and a read-only memory (ROM). The memory stores program codes or commands that are configured to have the CPU execute a process. The memory, which is a computer readable medium, may be any available medium that is accessible by a versatile or dedicated computer.

Operation of Present Embodiment

When the in-pipe pressure P of the pipe is greater than or equal to a specified pipe pressure, the controller 72 opens the first valve 64. When the first valve 64 opens, the gas fuel in the delivery pipe 52 is stored in the vacuum tank 61 through the first relief passage 62. This reduces the in-pipe pressure P.

When the internal combustion engine 10 is in a stopped state, the pressure inside the surge tank 24 is substantially equal to the atmospheric pressure. Thus, the pressure of the relief passage 60 at a side of the second valve 65 toward the intake passage 21 is higher than the pressure at a side of the second valve 65 toward the delivery pipe 52. Therefore, the second valve 65 is closed. That is, when the internal combustion engine 10 is in a stopped state, the gas fuel that has flowed into the vacuum tank 61 from the delivery pipe 52 remains stored in the vacuum tank 61.

When the internal combustion engine 10 is activated, the pressure of the intake passage 21, including the surge tank 24, decreases as the piston 13 and the intake valve 21A operate. However, immediately after the internal combustion engine 10 is started, the amount of intake air flowing through the intake passage 21 is relatively small. Thus, the pressure of the surge tank 24 is not significantly reduced. Thus, even if the pressure of the surge tank 24 is smaller than the pressure of the vacuum tank 61, the second valve 65 remains closed if the differential pressure is less than the specified pressure. Thus, in this case, the gas fuel remains stored in the vacuum tank 61.

An example assumes that the amount of intake air in the internal combustion engine 10 increases while the internal combustion engine 10 is in a non-supercharging operation state after the internal combustion engine 10 is started. This significantly reduces the pressure of the intake passage 21. The second valve 65 opens when the pressure of the relief passage 60 at a side of the second valve 65 toward the intake passage 21 becomes lower than the pressure of the relief passage 60 at a side of the second valve 65 toward the delivery pipe 52 by an amount that is greater than or equal to the specified pressure. As a result, the gas fuel that has flowed into the vacuum tank 61 from the delivery pipe 52 flows into the surge tank 24. The gas fuel that has flowed into the surge tank 24 is introduced to the cylinder 12 and burned.

An example assumes that the internal combustion engine 10 performs a supercharging operation as the required torque of the internal combustion engine 10 increases. In this case, the pressure of the surge tank 24 is greater than the atmospheric pressure. Thus, the pressure of the relief passage 60 at a side of the second valve 65 toward the intake passage 21 is higher than the pressure at a side of the second valve 65 toward the delivery pipe 52. Therefore, the second valve 65 is closed. That is, when the internal combustion engine 10 is performing the supercharging operation, the gas fuel remains stored in the vacuum tank 61 even if the gas fuel is flowing into the vacuum tank 61 from the delivery pipe 52.

Advantages of Present Embodiment (1) As described above, when the pressure of the relief passage 60 at a side of the second valve 65 closer to the intake passage 21 is low enough, the second valve 65 is opened. When the pressure of the relief passage 60 at a portion closer to the intake passage 21 is low, a large amount of intake air is supplied to the internal combustion engine 10. Therefore, in the above-described embodiment, even if the second valve 65 opens and the gas fuel flows into the surge tank 24, the internal combustion engine 10 is unlikely to be in a state in which fuel is excessively rich.

(2) In the above-described embodiment, the vacuum tank 61 can be used as a supply destination of gas fuel from the first valve 64. Since the vacuum tank 61 has a sufficient volume, the pressure of the vacuum tank 61 is unlikely to vary greatly even if gas fuel is supplied. In addition, since the volume of the vacuum tank 61 is relatively large, the concentration of the gas fuel is significantly decreased when the gas fuel is supplied from the first valve 64. Thus, even if air containing gas fuel is supplied from the vacuum tank 61 to the surge tank 24, the influence on the air-fuel ratio of the gas fuel is relatively small.

(3) In the above-described embodiment, the existing vacuum tank 61 for supplying negative pressure to the actuator is used as a supply destination of gas fuel from the first valve 64. Accordingly, it is not necessary to newly install a member having a large volume as a supply destination of gas fuel from the first valve 64.

Modified Examples

The present embodiment may be modified as follows. The present embodiment and the following modifications can be combined as long as the combined modifications remain technically consistent with each other.

The configuration of the vehicle 500 is not limited to that described in the above-described embodiment. For example, the configuration related to the forced-induction device 40 may be omitted from the vehicle 500. The vehicle 500 only needs to include the configuration related to at least the fuel supply device 50 and the combustion of the internal combustion engine 10.

In the above-described embodiment, the vacuum tank 61 may be omitted from the relief passage 60. When the vacuum tank 61 is omitted, the relief passage 60 does not have to include the first relief passage 62 and the second relief passage 63, and may be a single pipe. Also, the relief passage 60 may further include a tank or the like differing from the vacuum tank 61.

In the above-described embodiment, the first valve 64 and the second valve 65 may be electromagnetic valve or mechanical valves. The second valve 65 may have any configuration as long as the second valve 65 is open when the pressure of the relief passage 60 at a side of the second valve 65 closer to the intake passage 21 becomes lower than the pressure of the relief passage 60 at a side of the second valve 65 closer to the delivery pipe 52 by the specified pressure or greater.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A fuel supply device, comprising:
a fuel injection valve configured to inject gas fuel;
a delivery pipe that supplies the gas fuel to the fuel injection valve;
a relief passage that connects an intake passage of an internal combustion engine and the delivery pipe;
a first valve configured to open so that the gas fuel in the delivery pipe is supplied to the relief passage; and
a second valve arranged in the relief passage, wherein:
the delivery pipe, the first valve, the second valve, and the intake passage are arranged in this order; and
a downstream pressure refers to a pressure of the relief passage at a side of the second valve toward the intake passage,
an upstream pressure refers to a pressure of the relief passage at a side of the second valve toward the delivery pipe,
the second valve includes a body, a valve member configured to close an opening in the body, and a spring that presses the valve member against the opening of the body,
the second valve is configured to open in response to the downstream pressure becoming lower than the upstream pressure by an amount that is greater than a pressing force of the spring that presses the valve member against the opening of the body, and
in response to the second valve opening, the gas fuel upstream from the second valve flows into the intake passage.

2. The fuel supply device according to claim 1, wherein:
the relief passage includes a vacuum tank configured to supply a negative pressure to a brake booster of a vehicle; and
the delivery pipe, the vacuum tank, and the second valve are arranged in this order.

* * * * *